United States Patent [19]
Bian et al.

[11] Patent Number: 6,077,586
[45] Date of Patent: Jun. 20, 2000

[54] LAMINATED THIN FILM DISK FOR LONGITUDINAL RECORDING

[75] Inventors: Xiaoping Bian, San Jose; Mary Frances Doerner, Santa Cruz; Mohammad Taghi Mirzamaani, San Jose, all of Calif.

[73] Assignee: International Business Machines Corporation, Armonk, N.Y.

[21] Appl. No.: 08/892,724

[22] Filed: Jul. 15, 1997

[51] Int. Cl.[7] ....................................................... G11B 5/66
[52] U.S. Cl. ...................... 428/65.3; 428/65.6; 428/65.7; 428/336; 428/694 T; 428/694 TS; 428/694 TP; 428/694 TM; 428/900; 204/192.2
[58] Field of Search .......................... 428/694 T, 694 TS, 428/694 TP, 694 TM, 900, 336, 65.3, 65.6, 65.7; 204/192.2

[56] References Cited

U.S. PATENT DOCUMENTS

| | | | |
|---|---|---|---|
| 4,743,491 | 5/1988 | Asada et al. | 428/213 |
| 4,749,628 | 6/1988 | Ahlert | 428/660 |
| 5,051,288 | 9/1991 | Ahlert et al. | 428/65.3 |

OTHER PUBLICATIONS

"Effects of Cr Intermediate Layers on CoCrPt Thin Film Media on NiAl Underlayers", Li–Lien Lee, et al., IEEE Transactions on Magnetics vol. 31, No. 6 Nov. 1995, p. 2728.

"NiAl Underlayers For CoCrTa Magnetic Thin Films", Li–Lien Lee, et al., IEEE Transactions on Magnetics, vol. 30, No. 6 Nov. 1994, p. 3951.

"Sputtered Multilayer Films for Digital Magnetic Recording", W.T. Maloney, IEEE Transactions on Magnetics, vol. Mag–15, No. 3 Jul. 1979, p. 1135.

"Design and Crystallography of Multilayered Media", Laughlin, et al., Journal of Magnetism and Magnetic Materials 155 (1996) 146–150.

"The Control and Characterization of the Crystallographic Texture of Longitudinal Thin Film Recording Media", Laughlin et al., IEEE Transactions on Magnetics vol. 32, No. 5 Sep. 1996, p. 3632.

"Interaction Effects in Multi–Layer Thin Film Media", El–hilo, et al., IEEE Transactions on Magnetics, vol. 27, No. 6 Nov. 1991, p. 5061.

"Reduction of Media Noise in Thin Film Media by Lamination", Lambert, et al., IEEE Transactions on Magnetics, vol. 26, No. 5 Sep. 1990, p. 2706.

"Noise Properties of Multilayered Co–Allow Magnetic Recording Media", Murdock, et al., IEEE Transactions on Magnetics vol. 26, No. 5 Sep. 1990, p. 2700.

"Magnetic Ultrathin Films, Multilayers and Surfaces Interfaces and Characterization", Feng et al., Materials Research Society Symposium Proceedings vol. 313, p. 357.

Lee, et al. "Effects of Cr. Intermediate Layers . . . " IEEE Transactions on Magnetics, vol. 31, No. 6, Nov. 1995.

Lee, et al "NiAl Underlayers for CoCrTa Magnetic Films" IEEE, Transactions on Magnetics, vol. 30, No. 6, Nov. 1994.

*Primary Examiner*—Leszek Kiliman
*Attorney, Agent, or Firm*—G. Marlin Knight

[57] ABSTRACT

A thin film disk with laminated magnetic layers, for use in a disk drive, is described which exhibits a single switching behavior resulting in a smooth hysteresis loop. This is achieved by depositing a seed layer prior to depositing the Cr or Cr alloy underlayer. The seed layer material is selected to promote a [112] PO in the underlayer and subsequently a [10$\bar{1}$0] PO in the two or more laminated magnetic layers. The [10$\bar{1}$0] PO aids in maintaining minimal Hc variations between the magnetic layers. The seed layer can be a B2 type structure material such as NiAl or FeAl or any other material which results in the [112] PO in the underlayer. The underlayer is preferably Cr or a Cr alloy; the magnetic layers are preferably CoPtCr, CoPtCrTa or CoPtCrB. The spacer layer between the magnetic layers may be made from the same material as the underlayer, but may also be different, e.g. an hexagonal crystalline material such as Ru. The disks of the invention can be manufactured in standard high volume sputtering systems by virtue of the fact the magnetic layers have a reduced dependency on substrate temperature.

28 Claims, 5 Drawing Sheets

LAMINATED THIN FILM DISK FOR LONGITUDINAL RECORDING

FIELD OF THE INVENTION

This invention relates to the field of data storage devices such as disk drives having thin film magnetic disks. More particularly the invention relates to thin film magnetic disks having multiple magnetic layers.

BACKGROUND OF THE INVENTION

The magnetic recording disk in a conventional drive assembly typically consists of a substrate, an underlayer consisting of a thin film of chromium (Cr) or a Cr alloy, a cobalt-based magnetic alloy deposited on the underlayer, and a protective overcoat over the magnetic layer. A variety of disk substrates such as NiP-coated AlMg, glass, glass ceramic, glassy carbon, etc., have been used. The microstructural parameters of the magnetic layer, i.e., crystallographic preferred orientation (PO), grain size and magnetic exchange decoupling between the grains, play key roles in controlling the recording characteristics of the disk. The Cr underlayer is mainly used to control such microstructural parameters as the PO and grain size of the cobalt-based magnetic alloy. The PO of the various materials forming the layers on the disk is not necessarily an exclusive orientation which may found in the material, but is merely the dominant orientation. When the Cr underlayer is deposited at elevated temperature on a NiP-coated AlMg substrate a [100] preferred orientation (PO) is usually formed. This PO promotes the epitaxial growth of [11$\bar{2}$0] PO of the hcp cobalt (Co) alloy, thereby improving the in-plane magnetic performance of the disk. The [11$\bar{2}$0] PO refers to a film of hexagonal structure whose (11$\bar{2}$0) planes are predominantly parallel to the surface of the film. Likewise the [10$\bar{1}$0] PO refers to a film of hexagonal structure whose (10$\bar{1}$0) planes are predominantly parallel to the surface of the film. Since nucleation and growth of Cr or Cr alloy underlayers on glass and most non-metallic substrates differ significantly from those on NiP-coated AlMg substrates, media fabricated on glass substrates often have larger noise compared with those made on NiP-coated AlMg substrates under identical deposition conditions. It is for this reason that the use of an initial layer on the substrate (called the seed layer) is necessary. The seed layer is formed between the alternate substrate and the underlayer in order to control nucleation and growth of the underlayer which in turn affects the magnetic layer. Several materials have been proposed for seed layers such as: Al, Cr, CrNi, Ti, Ni$_3$P, MgO, Ta, C, W, Zr, AlN and NiAl on glass and non-metallic substrates. (See for example, "Seed Layer induced (002) crystallographic texture in NiAl underlayers," Lee, et al., J. Appl. Phys. 79(8), Apr. 15, 1996, p.4902ff). In a single magnetic layer disk, Laughlin, et al., have described use of an NiAl seed layer followed by a 2.5 nm thick Cr underlayer and a CoCrPt magnetic layer. The NiAl seed layer with the Cr underlayer was said to induce the [10$\bar{1}$0] texture in the magnetic layer. ("The Control and Characterization of the Crystallographic Texture of Longitudinal Thin Film Recording Media," IEEE Trans. Magnetic. 32(5) September 1996, 3632).

The improvement in signal to noise ratio (SNR) of the thin film disk media remains as one of the major challenges in high density recording technology. A variety of approaches such as choosing a low noise alloy, designing an appropriate underlayer, tailoring of the deposition parameters, and lamination of the magnetic layer have been suggested to reduce the media noise. A laminated disk has two or more magnetic layers separated by a spacer layer. For example, Ahlert, et al. in commonly assigned U.S. Pat. No. 5,051,288 describe laminated disks with AlMg/NiP substrates and up to six layers of CoPtX or CoNiX alloys separated by Cr, CrV and Mo layers.

Laminating the magnetic layer of a thin film disk is known to reduce the media noise, but laminated media typically exhibit a bi-modal switching behavior due to the fact that the coercivity (Hc) of the stacked magnetic layers can be significantly different. Laminated media with optimum performance should exhibit only one type of switching behavior, which means the stacked magnetic layers should have very similar Hc. For most magnetic alloys employed in thin film disk technology Hc is a function of deposition temperature, i.e., Hc increases with substrate temperature. The sputtering systems used for the volume production of magnetic disks provide the capability to preheat the substrates, but as the sputtering process progresses over time the temperature of the substrate declines. Thus, when laminated magnetic layers are sputtered on a preheated substrate, the second layer is deposited at a lower temperature and will typically have a lower Hc. The reduced Hc in the second layer at least contributes to a deviation (kink) in the smooth slope of the hysteresis loop around the zero remanent magnetization state. FIGS. 3a and 3b show typical hysteresis loops of a single magnetic layer (Cr/CoPtCrTa) and a two layer laminated magnetic film (Cr/CoPtCrTa/Cr/CoPtCrTa), respectively. The kink in the hysteresis of the laminated film is clearly seen. The existence of this kink implies that the film has two switching characteristics which will deteriorate the recording performance of the disk at high recording densities. Thus, it is desirable to design a laminated media without bi-modal switching behavior to eliminate this kink, or to reduce it as much as possible.

SUMMARY OF INVENTION

The design of a thin film disk, for use in a disk drive, with laminated magnetic layers is described. The disk has reduced noise and exhibits a single switching behavior which results in improved recording performance in a disk drive utilizing the disk. The improved disk is formed by depositing two or more laminated magnetic layers with PO [10$\bar{1}$0] with minimal Hc variations. In one embodiment the [10$\bar{1}$0] PO magnetic layers are produced by depositing a B2 structure seed layer such as NiAl or FeAl and an appropriate underlayer with [112] PO. Disks embodying the invention have a smooth hysteresis loop with minimal sign of bi-modal switching. The seed layer is preferably NiAl; the underlayer is preferably Cr or a Cr alloy; the magnetic layers are preferably CoPtCr, CoPtCrTa or CoPtCrB. The spacer layer between the magnetic layers may be made from the same material as the underlayer, but may also be different, e.g. an hexagonal crystalline material such as Ru. The disks of the invention have good manufacturability in standard high volume sputtering systems by virtue of the fact that the Hc of the magnetic layers with [10$\bar{1}$0] PO appears to have a reduced dependency on the substrate temperature.

DETAILED DESCRIPTION OF THE PREFERRED EMBODIMENTS

Figure 1:
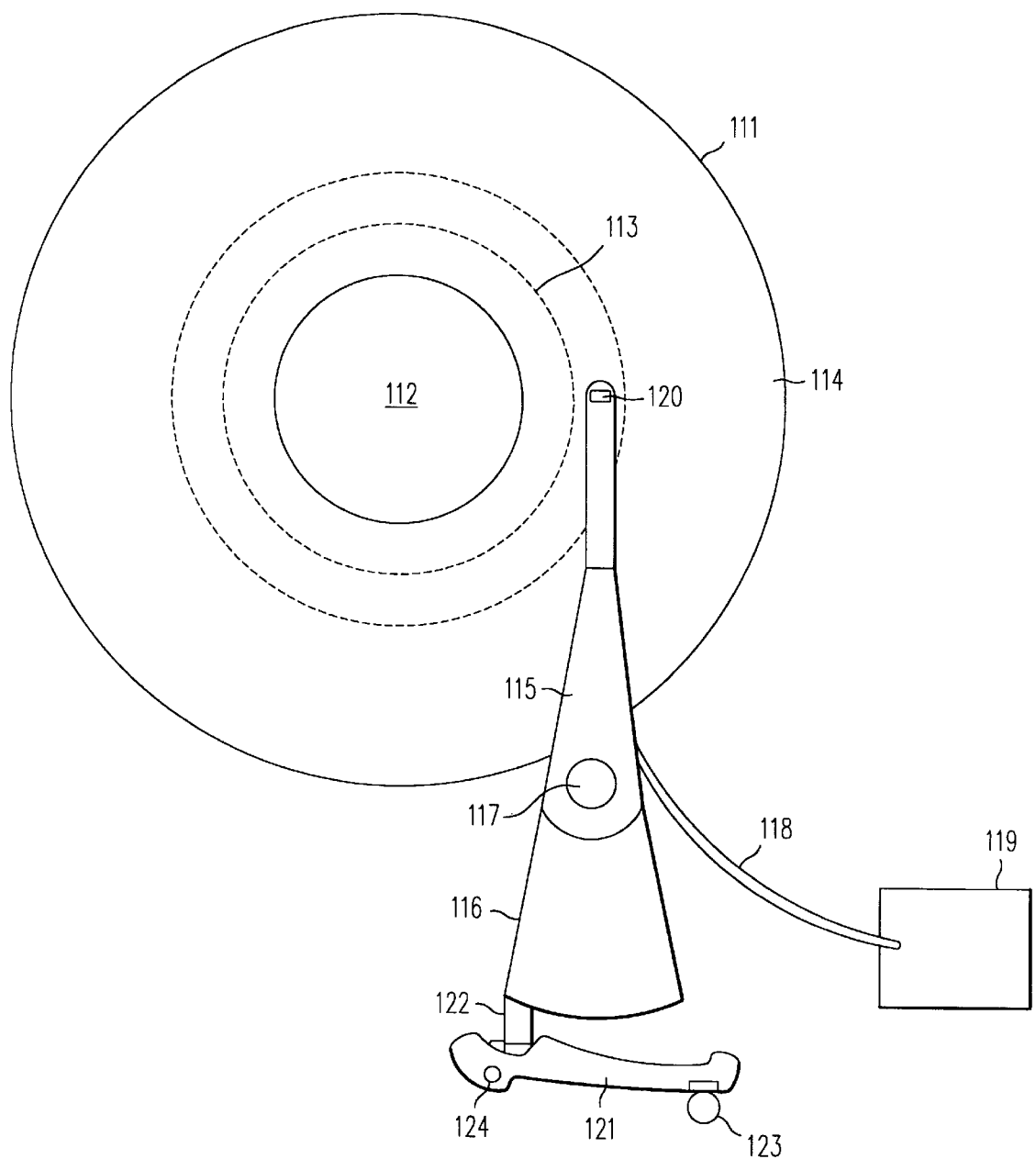
FIG. 1 illustrates a top view of a prior art disk drive with a rotary actuator useful in practicing the present invention.

FIG. 1 is a top view illustrating a prior art disk drive with a rotary actuator useful in practicing the present invention. The system comprises one or more magnetic recording disks 111 mounted on spindle 112 which is rotated by an in-hub electrical motor (not shown). An actuator assembly 115 supports a slider 120 which contains one or more read/write heads. The assembly may be composed of a plurality of actuators and sliders arranged in a vertical stack with the actuators supporting the sliders in contact with the surfaces of the disks when the disks are not rotating or being unloaded to avoid contact. A voice coil motor (VCM) 116 moves the actuator assembly 115 relative to the disks by causing the assembly to pivot around shaft 117. The heads are typically contained in air bearing sliders adapted for flying above the surface of the disks when rotating at sufficient speed. In operation, when the sliders are flying above the disks the VCM moves the sliders in an arcuate path across the disks allowing the heads to be positioned to read and write magnetic information from circular tracks formed in the data area 114 which is coated with the thin films which will be described in more detail below. Electrical signals to and from the heads and the VCM are carried by a flex cable 118 to the drive electronics 119. When not operating and during periods when the rotation of the disks is either starting or stopping, the sliders may be positioned in physical contact with the surface of the disks in a landing zone or contact start/stop (CSS) area 113 which is not used for data storage even though the magnetic coating extends over this area. It is also known to remove the sliders from the disks during nonoperating periods using an unload ramp. Although the disk drive has been described with air bearing sliders the disk of the present invention may easily be used in other storage devices having near contact, or contact recording sliders.

Figure 2:
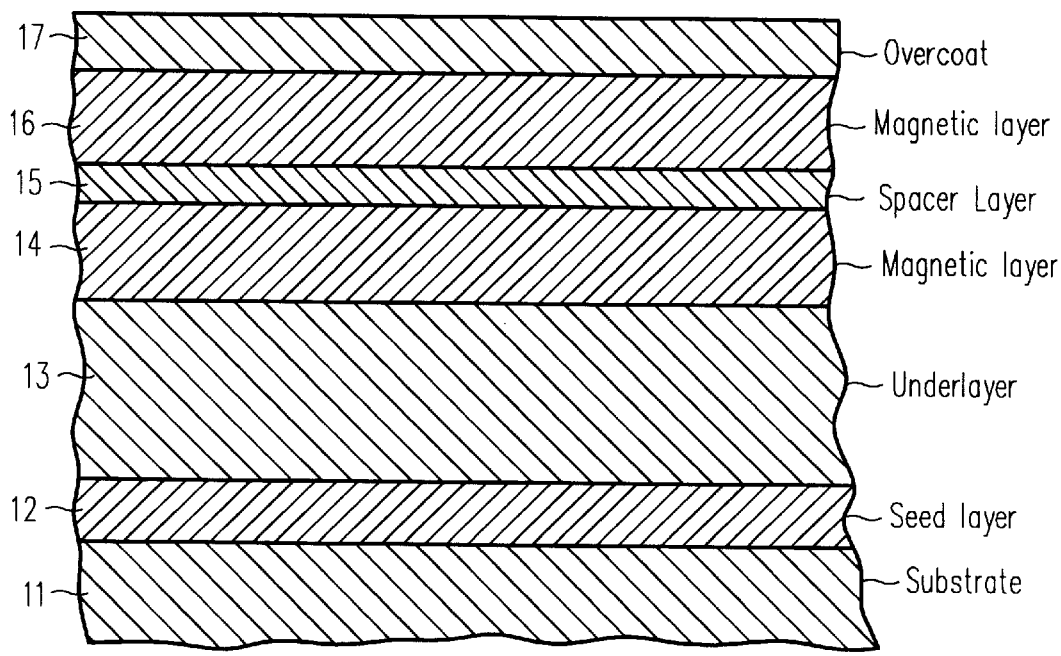
FIG. 2 illustrates the layer structure of a thin film magnetic disk according to the invention.

FIG. 2 illustrates the cross sectional layer structure of an embodiment of a thin film magnetic disk according to the invention. The thin film layers will be deposited onto at least one and preferably both planar surfaces of the disk to form the data recording area. The shading is used only to differentiate the layers and not to color or specific composition. The substrate 11 may be made of AlMg/NiP, glass or any other suitable material. The seed layer 12 in one embodiment is a B2 structure material which is deposited directly onto the substrate and is preferably NiAl. The underlayer 13 is deposited onto the seed layer and is a nonferromagnetic material such as chromium or a chromium alloy such as CrV or CrTi. The requirements for the seed layer and underlayer for a disk according to the invention are that they promote the [10$\bar{1}$0] PO in the magnetic layer. The first ferromagnetic layer 14 (Mag1) is an alloy of cobalt which typically contains platinum and chromium and may contain additional elements such as tantalum or boron, e.g. CoPtCrTa or CoPtCrB. A typical magnetic layer might comprise 4 to 14 at. % platinum, 18 to 23 at. % chromium and 1 to 5 at. % tantalum with the rest being Co. The spacer layer 15 is made of a nonferromagnetic material which may optionally be the same material as the underlayer. The second ferromagnetic layer 16 (Mag2) is preferably of the same material as Mag1. At least two magnetic layers separated by a nonmagnetic spacer are required, but additional spacer/magnetic layer pairs may be added. The optional top layer is a protective overcoat 17 which can be carbon, hydrogenated carbon or any other protective material. It is also known in the art to use additional layers between the magnetic layer and the overcoat to either enhance the adhesion of the overcoat, improve hardness, etc. The various layers are preferably sputter deposited using standard techniques, targets, temperatures and pressures as are known to those skilled in the art. Although the invention relates to laminated magnetic layers, the deposition techniques and parameters are the same as used for single magnetic layer disks using comparable materials.

Figure 5:
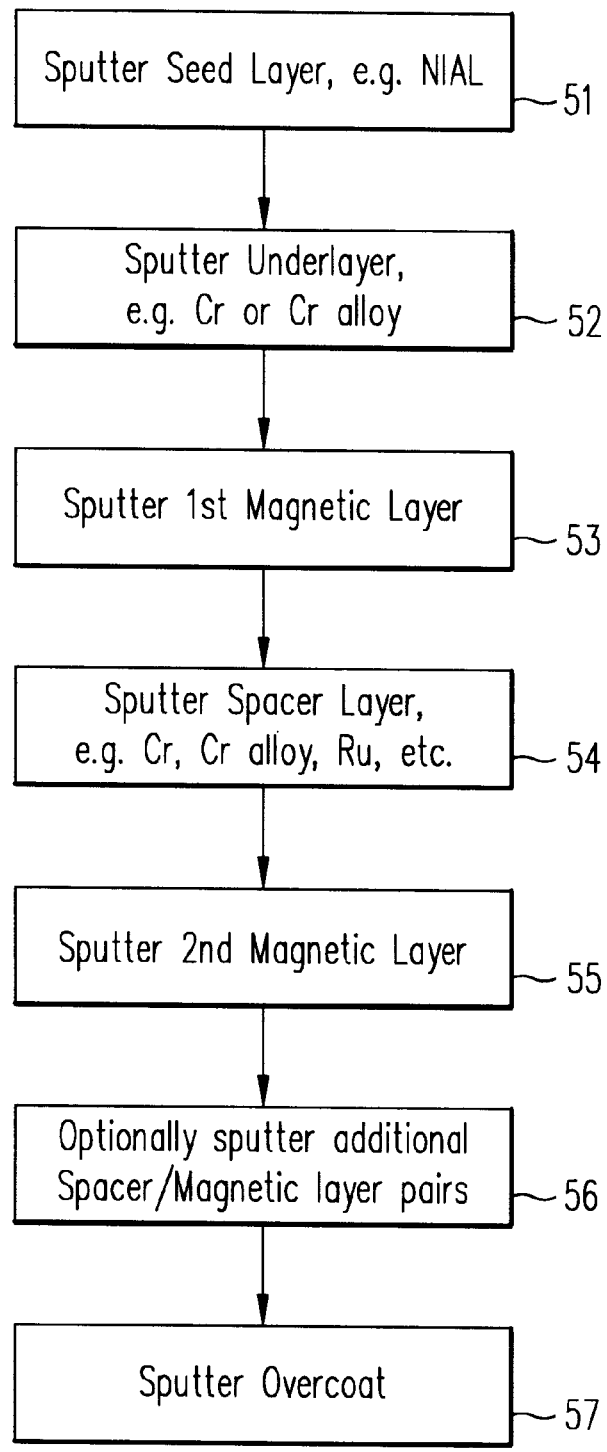
FIG. 5 is a flow chart of one method for making disks according to the invention.

FIG. 5 is a flow chart of the steps for one method of making a disk according to the invention. All of the layers from the seed layer to the overcoat can be sputtered in a continuous process in either an in-line sputtering system or a single disk system. Current commercial in-line sputtering systems may be equipped with additional targets and/or multiple-pass capability to fabricate laminated disk structures. Designing an in-line system with additional targets is a straightforward task. There are also commercially available single disk systems with 6 or more target capacity with the capability to fabricate laminated disk structures. Starting with a substrate which can be AlMg/NiP, glass or any other suitable material, the layers are sequentially sputter deposited as indicated in FIG. 5. The seed layer 51 is deposited first, followed by the underlayer 52, then the first magnetic layer 53, then the spacer layer 54, then the second magnetic layer 55, followed optionally by additional spacer/magnetic layer pairs 56, and then the optional last step deposits a protective overcoat 57.

The relative thicknesses of the layers are not believed to be critical for practicing the invention, but the following ranges are given as guidance. The seed layer is preferably from 10 to 50 nm thick. The seed layer's role is to encourage a [112] PO in the underlayer and subsequently a [10$\bar{1}$0] PO in the magnetic layers. The underlayer is typically thicker than the seed layer, but wide variations in the thickness of the underlayer (e.g. 10 to 80 nm) result in only small changes in the magnetic characteristics of the disk. A typical value for the thickness of the underlayer is 50 nm. The ferromagnetic layers Mag1, Mag2, etc. can be from 5–50 nm thick with 15 nm being typical. The thicknesses of the magnetic layers do not need to be equal. The spacer layer is normally relatively thin in comparison with the underlayer and will typically be 1 to 20 nm in thickness. The use, composition and thickness of the overcoat are not critical in practicing the invention, but a typical thin film disk might use an overcoat less than 15 nm thick.

Figure 3:
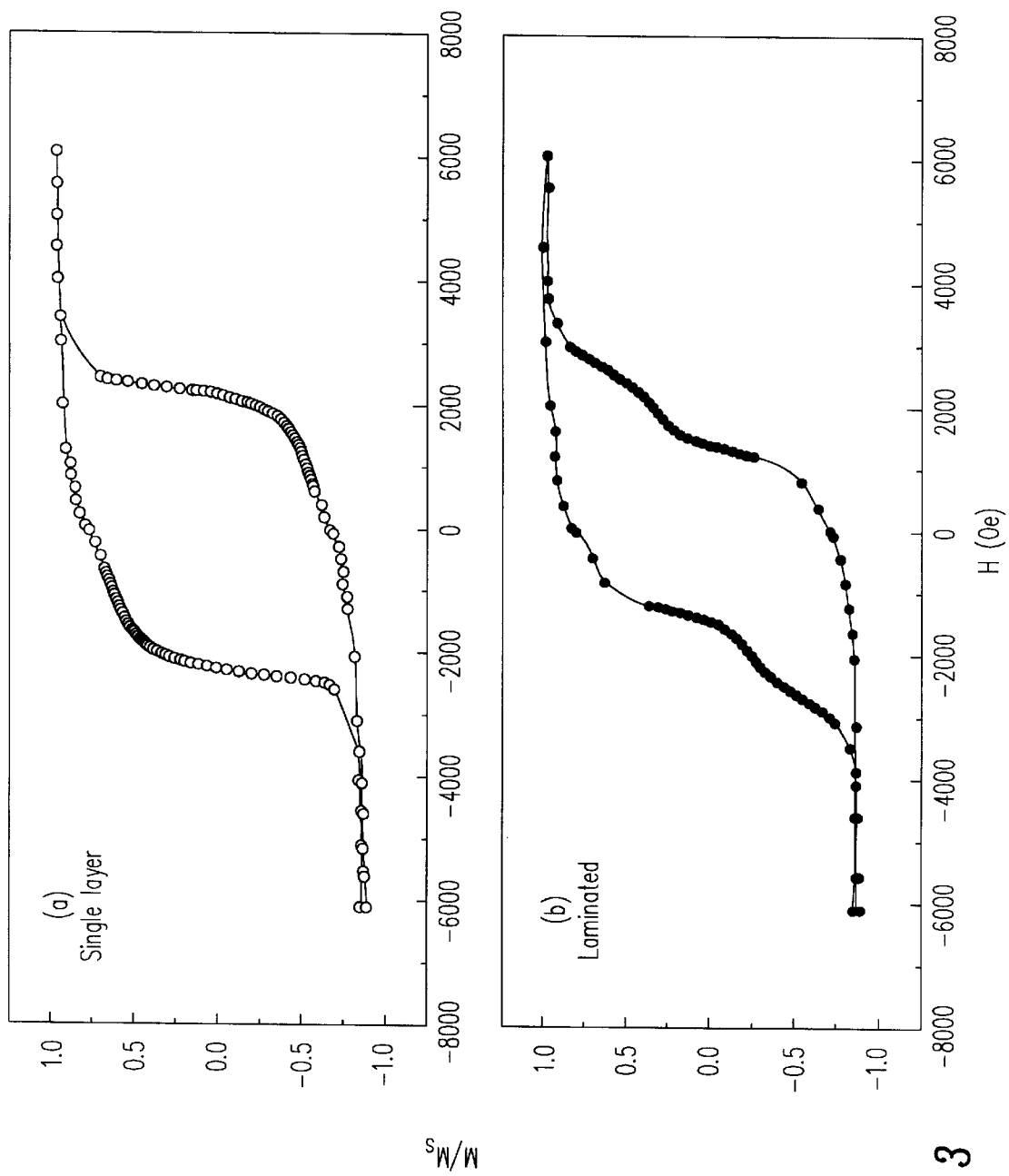
FIG. 3a illustrates the hysteresis loop of a prior art thin film magnetic disk with a single magnetic layer.
FIG. 3b illustrates the hysteresis loop of a prior art thin film magnetic disk with two laminated magnetic layers.
Figure 4:
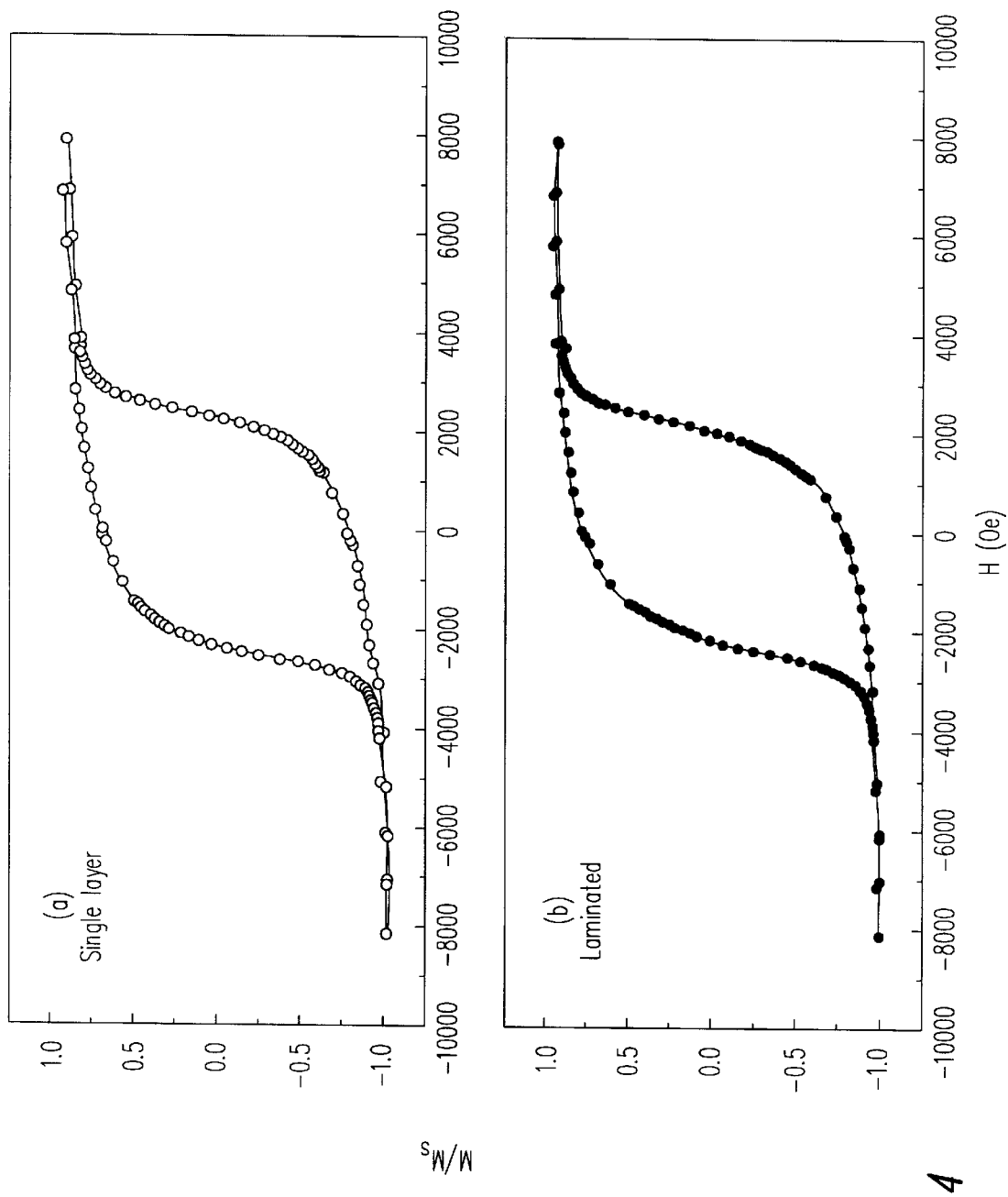
FIG. 4a illustrates the hysteresis loop of a thin film magnetic disk with a NiAl seed layer and a single magnetic layer.
FIG. 4b illustrates the hysteresis loop of a thin film magnetic disk with a NiAl seed layer and two laminated magnetic layers.

FIG. 4a shows the hysteresis loop of a single magnetic layer (NiAl/Cr/CoPtCrTa) and FIG. 4b is the loop for a two layer laminated magnetic film according to the invention: NiAl/Cr/CoPtCrTa/Cr/CoPtCrTa. Unlike the prior art laminated disk case shown in FIG. 3b, where the bi-modal switching creates the anomaly in the hysteresis loop, the laminated disk embodying the invention (see FIG. 4b) shows no bi-modal switching effect and no anomaly in the hysteresis loop. It is believed that the result is due to the fact that the deposition of NiAl seed layer prior to Cr, minimizes the coercivity loss of the second layer due to the lower deposition temperature. To prove this, disks with single magnetic layers (NiAl/Cr/CoPtCrTa) were deposited at two temperatures differing by about 100 C. to correspond to (or exceed) the deposition temperature delta of the first and second magnetic layers of a laminated structure. Across a wide range of Cr underlayer thicknesses the Hc of the test disks tracked within about 100 Oe indicating that the Hc is not a strong function of deposition temperature. Prior art laminated disks have involved tradeoffs between SNR, which is improved by lamination, versus coercive squareness (S*) and resolution which are degraded. The laminated disk of the invention minimizes these tradeoffs by keeping the Hc of the magnetic layers more closely matched and maintaining a higher S*. It is an additional benefit that reduced sensitivity to temperature means that the disks are more manufacturable, i.e., less likely to fall out of specification with variations in the sputtering systems.

NiAl which is the preferred material for the seed layer forms the B2(cesium chloride) structure whereas Cr has a bcc structure. The B2 structure is an ordered cubic structure that can be described as two interpenetrating simple cubic lattices where Al atoms occupy one lattice and Ni atoms the other. NiAl has a lattice constant which is nearly identical to that of Cr, but NiAl tends to form smaller grain size due to the bonding between the Ni and Al atoms which reduces atomic mobility during deposition. Cobalt alloys used in magnetic recording typically have a predominantly hexagonal closed packed (hcp) crystal structure. A cubic Cr underlayer can be deposited with PO [100] within normal thickness ranges under standard sputtering conditions such as sufficiently high temperature. This Cr [100] PO encourages PO [11$\bar{2}$0] in Co alloy magnetic layer which is often described as the desired PO for longitudinal recording. The PO [11$\bar{2}$0] results in a bi-crystal structure such that on a given Cr grain, multiple [11$\bar{2}$0] grains with two orthogonal c-axis orientations will form. (See for example, Nolan and Sinclair, "Effects of Microstructural Features on Media Noise in Longitudinal Recording Media," J. Appl. Phys., v73, p.5566, 1993). In order to maintain high Hc with this orientation a high substrate temperature is needed to create sufficient isolation (segregation) between the bi-crystals. Therefore, the Hc of films with [1120] PO is very temperature sensitive. Furthermore, it is more difficult to maintain layer to layer epitaxy while maintaining a constant grain size and consistent magnetic properties in laminated [11$\bar{2}$0] PO films. The original Cr underlayer grain structure cannot be reproduced in a Cr spacer layer, since the spacer layer Cr must grow on the smaller grains (bi-crystal clusters) of the magnetic layer. Therefore, the [11$\bar{2}$0] PO is not desirable in a laminated magnetic medium. By depositing a seed layer such as NiAl the [112] PO in the Cr (or Cr alloy) underlayer can be induced. The underlayer with a [112] PO epitaxially leads to [10$\bar{1}$0] PO in the adjacent magnetic layer. The PO of [10$\bar{1}$0] can then be maintained in each of the subsequent magnetic layers by the proper choice of a spacer layer while maintaining a constant grain size throughout the structure.

The [10$\bar{1}$0] PO in the magnetic layers which results from the described materials structure is believed to contribute to the favorable results observed for the laminated disk structure of the invention and particularly to the reduced dependence of the Hc on substrate temperature. The [10$\bar{1}$0] PO is maintained in the second magnetic layer by proper selection and deposition of the spacer layer. The spacer layer material may be cubic with PO [112] and a lattice constant similar to Cr. Cr and Cr alloys are good choices for the spacer layer for the same reason as for the underlayer. It is also possible to use a spacer with an hcp structure so that the [10$\bar{1}$0] PO continues through the spacer layer. For example, epitaxial matching of ruthenium (Ru) and by extension osmium (Os) and rhenium (Re) all of which have an hexagonal structure as choices for a spacer layer for a laminated disk has been reported. It would also be expected that alloys of hexagonal materials which maintain the hexagonal structure could be used including, for example, nonferromagnetic CoCr alloys with Cr>35 at. %.

Laughlin, et al., have suggested that FeAl underlayers have an effect similar to NiAl on the magnetic properties of magnetic layers deposited thereon. (IEEE Trans. Magnetic. 32(5) September 1996, 3632). Therefore, it is reasonable to suggest that FeAl which also has a B2 structure may be used in the same way as NiAl for a seed layer. Other non-B2 materials, such as NiCr, which can induce the [112] PO in the Cr or Cr alloy underlayer can also be used.

While the compositions listed above have been given without regard to contamination percentages, it is known to those skilled in the art that some contamination is normally if not always present in thin films. Sputtering targets are typically specified as 99.9% or greater purity, but the resulting films may have much lower purity due to contamination in the sputtering chamber or other factors. For example, contamination by air in the chambers might result in measurable amounts of oxygen and/or hydrogen being incorporated into the film. For some carbon films 5 at. % hydrogen contamination has been measured in a typical sputtered layer. It is also known that some small amount of oxygen is normally found in Cr targets and in the resulting Cr layer. It is also possible for small amounts of the working gas in the sputtering system, e.g. argon, to be incorporated into a sputtered film. Contamination levels were not specifically measured in the disk samples described and, therefore, were assumed to be within normal ranges for sputtered thin film disks expected by those skilled in the art.

The thin film disk made according to the invention can be used for storing data in typical disk drives using either magnetoresistive or inductive heads and can be used in contact recording or with flyable heads. The read/write head is positioned over the rotating disk in the standard manner to either record or read magnetic information.

While the preferred embodiments of the present invention have been illustrated in detail, it will be apparent to the one skilled in the art that alternative embodiments of the invention are realizable without deviating from the scope and spirit of the invention.

What is claimed is:

1. A thin film magnetic disk comprising:

a substrate;

a nonferromagnetic seed layer deposited onto the substrate;

a nonferromagnetic underlayer deposited onto the seed layer;

a first ferromagnetic layer with a [10$\bar{1}$0] preferred orientation;

a nonferromagnetic spacer layer; and a second ferromagnetic layer with a [10$\bar{1}$0] preferred orientation.

2. The disk of claim 1 wherein the underlayer has a [112] preferred orientation.

3. The disk of claim 1 wherein the spacer layer has a [112] or a [10$\bar{1}$0] preferred orientation.

4. The disk of claim 1 wherein the underlayer has a [112] preferred orientation and the spacer layer has a [112] or a [10$\bar{1}$0] preferred orientation.

5. The disk of claim 1 wherein the seed layer comprises material with a B2 structure.

6. The disk of claim 1 wherein the seed layer comprises NiAl.

7. The disk of claim 1 wherein the seed layer comprises FeAl.

8. The disk of claim 1 wherein the spacer layer contains cobalt, chromium, ruthenium, osmium or rhenium and has a hexagonal structure.

9. The disk of claim 1 wherein the first ferromagnetic layer and the second ferromagnetic layer have coercivity which differs by less than 100 Oe.

10. The disk of claim 1 wherein the seed layer comprises NiAl, the underlayer comprises chromium or an alloy of chromium, the first ferromagnetic layer comprises a cobalt alloy, the spacer layer comprises chromium, ruthenium, osmium, rhenium or an alloy thereof, and the second ferromagnetic layer comprises a cobalt alloy and the disk further comprises an overcoat layer.

11. The disk of claim 10 wherein the seed layer is between 2 and 50 nm in thickness, the underlayer is between 10 and 80 nm in thickness, the first ferromagnetic layer is between 5 and 50 nm in thickness and the spacer layer is 1 to 20 nm in thickness.

12. The disk of claim 10 wherein the cobalt alloy of the first or second ferromagnetic layers is CoPtCrTa, or CoPtCrB.

13. A disk drive comprising:

a motor for rotating a spindle;

a thin film magnetic disk coupled to the spindle comprising a nonferromagnetic seed layer deposited onto a substrate, a nonferromagnetic underlayer deposited onto the seed layer, a first ferromagnetic layer with a $[10\bar{1}0]$ preferred orientation, a nonferromagnetic spacer layer, and a second ferromagnetic layer with a $[10\bar{1}0]$ preferred orientation; and an actuator assembly including a head for writing magnetic information on the disk as it rotates.

14. The disk drive of claim 13 wherein the underlayer has a [112] preferred orientation, the first ferromagnetic layer has a $[10\bar{1}0]$ preferred orientation and the spacer layer has a [112] or a $[10\bar{1}0]$ preferred orientation.

15. The disk drive of claim 13 wherein the seed layer comprises material with a B2 structure.

16. The disk drive of claim 13 wherein the seed layer comprises NiAl.

17. The disk drive of claim 13 wherein the seed layer comprises FeAl.

18. The disk drive of claim 13 wherein the spacer layer contains cobalt, chromium, ruthenium, osmium or rhenium and has a hexagonal structure.

19. The disk drive of claim 13 wherein the first ferromagnetic layer and the second ferromagnetic layer have coercivity which differs by less than 100 Oe.

20. The disk drive of claim 13 wherein the seed layer comprises NiAl, the underlayer comprises chromium or an alloy of chromium, the first ferromagnetic layer comprises a cobalt alloy, the spacer layer comprises chromium, ruthenium, osmium, rhenium or an alloy thereof, and the second ferromagnetic layer comprises a cobalt alloy and the magnetic disk further includes an overcoat layer.

21. The disk drive of claim 13 wherein the seed layer is between 2 and 50 nm in thickness, the underlayer is between 10 and 80 nm in thickness, the first ferromagnetic layer is between 5 and 50 nm in thickness and the spacer layer is 1 to 20 nm in thickness.

22. The disk drive of claim 21 wherein the cobalt alloy of the first and second ferromagnetic layers is CoPtCrTa, CoPtCrB or CoPtCr.

23. A method of manufacturing a thin film disk comprising the steps of:

sputtering a seed layer onto a substrate;

sputtering an underlayer onto the seed layer; and sputtering a first ferromagnetic layer with a $[10\bar{1}0]$ preferred orientation onto the underlayer;

sputtering a spacer layer onto the first ferromagnetic layer; and sputtering a second ferromagnetic layer with a $[10\bar{1}0]$ preferred orientation.

24. The method of claim 23 wherein the seed layer is a material with a B2 structure.

25. The method of claim 23 wherein the seed layer is a material is NiAl, FeAl or NiCr.

26. The method of claim 23 wherein the seed layer is a material is NiAl, the underlayer is Cr or a Cr alloy, and the first and second ferromagnetic layers are a cobalt alloy.

27. The method of claim 23 wherein the underlayer has a preferred orientation of [112].

28. The method of claim 23 wherein the spacer layer has a preferred orientation of [112] or [1010].

* * * * *